United States Patent Office 2,971,008
Patented Feb. 7, 1961

2,971,008

1,12-DIMETHYL - 6 - HYDROXY-7-(β-CARBOXYAL-KENYL) - 1,2,3,4,9,10,11,12 - OCTAHYDROPHE-NANTHRENE - 1 - CARBOXYLIC ACID ESTERS AND DERIVATIVES THEREOF

Roy H. Bible, Jr., Morton Grove, Ill., assignor to G. D. Searle & Co., Chicago, Ill., a corporation of Delaware No Drawing. Filed July 7, 1958, Ser. No. 746,604

9 Claims. (Cl. 260—343.2)

This invention relates to a new class of resin acid derivatives and, specifically, to 1,4a-dimethyl-6-hydroxy-7 - (β - carboxyalkenyl) - 1,2,3,4,4a,9,10,10a - octahydrophenanthrene-1-carboxylic acids, esters and derivatives thereof which can be represented by the following general structural formula

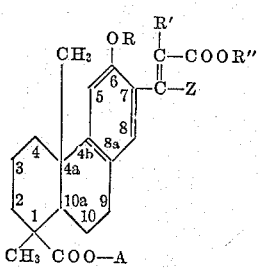

In this formula A, R, R', and R" are members of the group consisting of hydrogen and lower alkyl radicals, and Z is a member of the group consisting of phenyl and lower alkyl radicals. Included within the meaning of lower alkyl radicals in the structural representation of the compounds of this invention are straight and branched-chain aliphatic hydrocarbon radicals containing up to 6 carbon atoms. Compounds in which the lower alkyl groups are methyl, ethyl, and straight or branched-chain propyl, butyl, amyl, and hexyl are accordingly within the scope of this invention.

Compounds of this invention in which R and R" both represent hydrogen are prepared by heating a corresponding ether or ester with pyridine hydrochloride and pouring the reaction mixture into water. When there is a carboxyalkyl substituent at position 7 of such chain length that a stable lactone ring can be formed by intramolecular esterification with a free hydroxy group at position 6, this lactone can become the predominant species of reaction product. The lactones can be represented by the structural formula

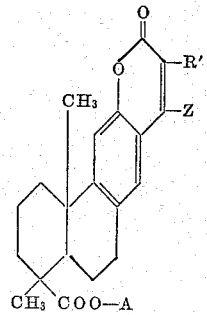

For example, upon reaction of methyl O-methyl-7-(α-methyl-β-carboxyvinyl)podocarpate with pyridine hydrochloride, the principal reaction product is the lactone of 7-(α-methyl-β-carboxyvinyl)podocarpic acid. This lactone is readily converted to the free hydroxy acid by treatment with a base. In general, the 6-membered lactones of this invention, when free of chain branching which provides a steric impediment to their formation, are relatively more stable than the free hydroxy acids to which they are related. Because of the facile interconversion of these lactones and their related hydroxy acids, they are equivalents for the purposes of this invention.

A convenient starting material for the preparation of the compounds described herein is an alkyl O-alkyl-7-acylpodocarpate such as methyl O-methyl-7-acetylpodocarpate. When this latter compound is treated with zinc and an alkyl α-haloalkanoate in a relatively unreactive organic solvent, such as benzene, addition takes place at the ketonic carbonyl group, and, after decomposition of the intermediate zinc complex, there is obtained a β-hydroxy ester having the following structural formula

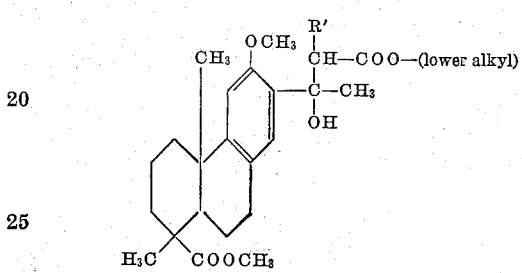

In this formula R' can represent hydrogen or a lower alkyl group. The β-hydroxy ester obtained in this manner is then dehydrated by heating it with one or a combination of reagents suitable for this purpose. Among the reagents useful for dehydrating the β-hydroxy esters represented by the foregoing formula are mineral acids such as sulfuric acid, inorganic acid salts such as potassium acid sulfate, inorganic acid chlorides such as phosphorus oxychloride, inorganic acid anhydrides such as phosphorus pentoxide, strong organic acids such as formic acid, organic acid chlorides such as acetyl chloride, organic acid anhydrides such as acetic anhydride, and various combinations of these reagents. In particular, it has been found that the process of heating the β-hydroxy esters represented by the foregoing structural formula at the reflux temperature with mixtures of acetic anhydride and acetyl chloride produces the claimed unsaturated derivatives in good yield and in a satisfactory state of purity.

For some purposes it is desired to prepare compositions having modified solubility properties. This is conveniently accomplished within the scope of this invention by subjecting the unsaturated dicarboxylic acid esters having the structural formula

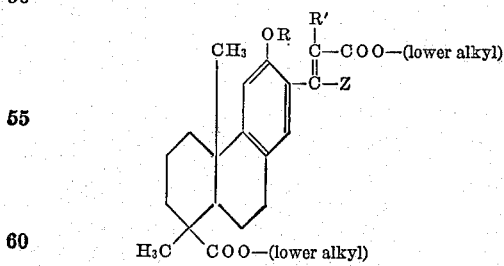

wherein R and R' are members of the group consisting of hydrogen and lower alkyl radicals and Z is a member of the group consisting of phenyl and lower alkyl radicals, to a partial alkaline hydrolysis. The difference in the degree of steric hindrance to which each of the two carboxylic acid ester groups is subject is so marked that when the saponification is carried out for from 3 to 4 hours at about 100° C., the ester group attached to the 1-position of the phenanthrene ring remains virtually unaffected, whereas the other ester group is almost quantitatively hydrolyzed, yielding after acidification a free carboxylic acid. By acidic hydrolysis, such as refluxing in acetic acid plus hydrobromic acid, or in pyridine hydrochloride, the phenolic ethers of this invention are conveniently cleaved to free phenols. An additional modification in solubility properties is achieved in these specific compositions.

The claimed compounds which constitute this invention have valuable pharmacological properties. In particular, they are effective in relieving a wide range of inflammatory conditions. Thus, they produce anti-inflammatory responses in relieving the hyperemia associated with inflammation of the iris. They also have a phenyl-butazone-like effect on local edema, particularly foot edema.

These compounds are also useful as ultraviolet shields; they exhibit high absorption of radiation in the ultraviolet region responsible for sunburn. Their incorporation in non-toxic oils provides effective sunburn screens. An additional utility of the claimed compounds is that they are valuable in chemical syntheses. For example, treatment of the claimed compositions with hydrogen in the presence of a noble metal catalyst such as palladium on charcoal causes hydrogenation of the ethylenic double bond and results in the production of a new series of compounds having the general structural formula

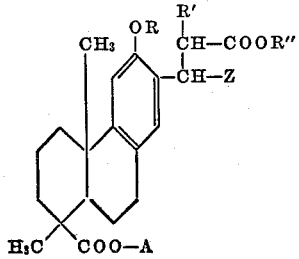

wherein A, R, R', and Z are defined as hereinbefore.

The following examples are set forth by way of illustration only, and it will be understood that the invention is not to be construed as limited in spirit or in scope by the details contained therein. It will be apparent to those skilled in the art that many modifications in materials and methods can be made without departing from the scope of the invention. In these examples temperatures are given in degrees centigrade (° C.), quantities of materials in parts by weight, and pressures in millimeters (mm.) of mercury.

The present invention is a continuation-in-part of my copending application Serial No. 476,065, filed December 17, 1954, now abandoned.

*Example 1*

Immediately prior to carrying out this reaction a quantity of zinc dust is prepared by washing it successively with 2% hydrochloric acid, water, alcohol, acetone, and ether, and by drying it in a vacuum oven at 100° C. for 15 minutes. A solution is prepared from 1500 parts of methyl O-methyl-7-acetylpodocarpate and 770 parts of ethyl bromoacetate in 2640 parts of anhydrous, thiophene-free benzene, and about half of this solution is added to 313 parts of the specially prepared zinc dust. The mixture is stirred and heated, and after the reaction is observed to begin, the remainder of the benzene solution is added slowly. After the addition has been completed, the reaction mixture is stirred and heated under reflux for an additional 2 hours. The unreacted zinc is removed, and the mixture is then acidified with dilute hydrochloric acid. Ether is added to insure complete solution of the organic product, and the ethereal phase is washed with dilute hydrochloric acid and then with several portions of water until the washings are neutral. The organic phase is dried and concentrated in a vacuum. By distillation of the residue in a short-path apparatus there is obtained a distillate of methyl O-methyl-7-[2-(1-ethoxycarbonyl-2-hydroxypropyl)]podocarpate. This material is obtained as a yellow glass showing a boiling point of 190–197° C. at 0.07 mm. pressure and a specific rotation of +105°. This product has the structural formula

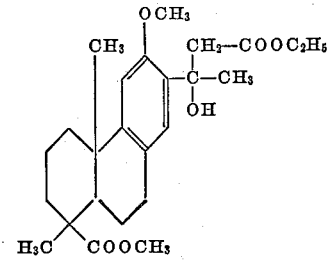

*Example 2*

A mixture of 1500 parts of methyl O-methyl-7-[2-(1-ethoxycarbonyl-2-hydroxypropyl)]podocarpate, as obtained in the preceding example, 1650 parts of acetyl chloride, and 2300 parts of acetic anhydride is heated under reflux for about 50 minutes. The reaction mixture is then concentrated under reduced pressure giving a residual, viscous yellow oil. When this residue is distilled in a vacuum in a short-path apparatus, the principal product is collected as a distillate boiling at about 195° C. at 0.15 mm. pressure. This material is a dehydration product, methyl O-methyl-7-(α-methyl-β-ethoxycarbonylvinyl)podocarpate, and it has the structural formula

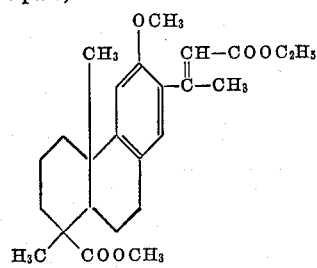

It shows a specific rotation of +117° and an ultraviolet absorption maximum at 270 millimicrons. Infrared maxima are observed at 5.85, 6.16, 6.22, and 6.40 microns.

Substitution of an equimolar amount of methyl bromoacetate for ethyl bromoacetate in Example 1 yields methyl O-methyl-7-[2-(1-methoxycarbonyl-2-hydroxypropyl)]podocarpate. Dehydration of this compound by the procedure of this example yields methyl O-methyl-7-(α-methyl-β-methoxycarbonylvinyl)podocarpate which is distilled at 190–200° C. at 0.15 mm. pressure.

*Example 3*

A solution prepared from 288 parts of methyl O-methyl-7-(α-methyl-β-ethoxycarbonylvinyl)podocarpate, as obtained in the preceding example, 100 parts of potassium hydroxide, 2100 parts of propylene glycol, 500 parts of water and 320 parts of methanol is heated at 90–100° C. for 3 hours. The mixture is poured into several times its volume of water, with good agitation, and the resulting suspension is allowed to stand for several hours. The precipitated material is removed by filtration. When the filtrate is acidified with dilute hydrochloric acid, the desired product precipitates and is collected on a filter and washed with water. It is purified by recrystallization from aqueous isopropyl alcohol or from aqueous acetone. This product is methyl O-methyl-7-(α-methyl-β-carboxyvinyl)podocarpate and has the structural formula

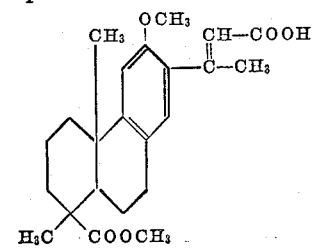

It shows a specific rotation of +129° and an ultraviolet absorption maximum at 267 millimicrons. Infrared absorption maxima appear at 5.82, 5.95, 6.17 (broad), and 6.42 microns.

Example 4

A mixture prepared from 200 parts of methyl O-methyl-7-[2-(1-ethoxycarbonyl - 2 - hydroxypropyl)]podocarpate, as obtained in Example 1, 2000 parts of water, 3200 parts of methanol, and 300 parts of sodium hydroxide is heated under reflux for a period of 4 hours. Most of the methanol is then removed by distillation, and the residual liquor is diluted with an additional quantity of water. Almost all of the material remains in solution; the small amount of insoluble residue is collected on a filter and discarded. The filtrate is acidified, and the pale yellow precipitate which forms is collected on a filter and washed well with water. By recrystallization from mixtures of ethyl acetate and cyclohexane, it is obtained as small, dense, almost white crystals. This product is methyl O-methyl-7-[2-(1-carboxy-2-hydroxypropyl)]podocarpate having the structural formula

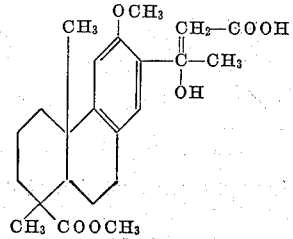

It shows ultraviolet absorption maxima at 277 and 285 millimicrons, and infrared absorption maxima at 2.87 (broad), 5.66, 5.80, 6.20, and 6.37 microns.

Example 5

A mixture of 60 parts of methyl O-methyl-7-(α-methyl-β-carboxyvinyl)podocarpate and 500 parts of pyridine hydrochloride is heated at 210° C. for 90 minutes. The mixture is allowed to cool to about 150° C., and is then cautiously poured with stirring into 2000 parts of water. The precipitate is collected on a filter and dried. Upon recrystallization from methanol, there is obtained the lactone of 7-(α-methyl-β-carboxyvinyl)podocarpic acid which melts at about 287–289° C. The compound, in its lactone form, has the structural formula

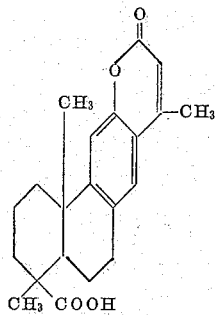

Example 6

A mixture of 302 parts of methyl O-methylpodocarpate and 1106 parts of chlorobenzene is cooled to 10° C. and then 273 parts of aluminum chloride are added with stirring. The mixture is stirred for about 10 minutes after which a solution of 183 parts of propionyl chloride in 155 parts of chlorobenzene are slowly added. The mixture is stirred at 10° C. for 3 hours, and then is allowed to stand at room temperature for 15 hours. The viscous oil is decomposed by pouring it over 1500 parts of ice and water containing 210 parts of hydrochloric acid. The chlorobenzene is steam distilled. The precipitate which forms on cooling is collected on a filter and recrystallized from methanol to yield methyl O-methyl-7-propionyl podocarpate melting at about 100–102° C. When methyl O-methyl-7-propionylpodocarpate in benzene solution is treated with ethyl bromoacetate and zinc dust by the method of Example 1, and the resulting reaction product is dehydrated by refluxing it with a mixture of acetyl chloride and acetic anhydride according to the method of Example 2, the product obtained is methyl O-methyl-7-(α - ethyl-β-ethoxycarbonylvinyl)podocarpate, which can be distilled at about 185–195° C. at 0.01 mm. pressure.

Example 7

A mixture prepared from 50 parts of the crude methyl O-methyl-7-(α - ethyl-β-ethoxycarbonylvinyl)podocarpate, obtained in Example 6, 20 parts of potassium hydroxide, 420 parts of propylene glycol, 100 parts of water, and 65 parts of methanol is heated on the steam bath for 3 hours. The mixture is diluted with several times its volume of water, and a small amount of insoluble residue is separated by filtration. Acidification of the filtrate with dilute hydrochloric acid produces a precipitate of methyl O-methyl-7-(α-ethyl-β-carboxyvinyl)podocarpate which is collected on a filter and washed with water. For purification it is redissolved in dilute potassium hydroxide solution and reprecipitated with hydrochloric acid. This compound has the following structural formula

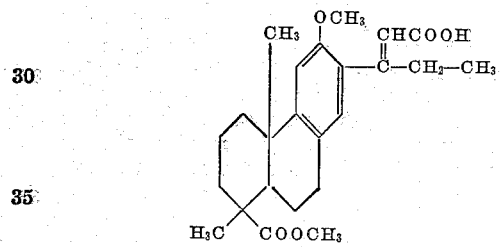

An ultraviolet absorption maximum is observed at 267 millimicrons.

Example 8

A solution is prepared from 400 parts of methyl O-methyl-7-acetylpodocarpate and 222 parts of ethyl α-bromopropionate in 700 parts of anhydrous, thiophene-free benzene, and about half of this solution is added to 84 parts of zinc dust which has been previously activated by washing it with 2% hydrochloric acid, water, alcohol, acetone, and ether, and by drying it in a vacuum oven at 100° C. for 15 minutes. The mixture is stirred and heated, and after the reaction is observed to begin, the remainder of the benzene solution is added slowly. When all of the benzene solution has been added, the reaction mixture is stirred and heated under reflux for an additional 2 hours. The unreacted zinc is removed, and the mixture is acidified with dilute hydrochloric acid. Ether is added to insure complete solution of the organic product, and the ethereal phase is washed with dilute hydrochloric acid and then with several portions of water, until the washings are neutral. The organic phase is concentrated in a vacuum, and the residue is subjected to distillation in a short-path apparatus. A distillate of methyl O-methyl-7-[2-(2-hydroxy-3-ethoxycarbonylbutyl)]podocarpate is obtained as a yellow glass showing a boiling point of about 200° at 0.08 mm. pressure.

Example 9

A mixture of 250 parts of methyl O-methyl-7-[2-(2-hydroxy - 3 - ethoxycarbonylbutyl)]podocarpate, as obtained in the preceding example, 280 parts of acetyl chloride, and 380 parts of acetic anhydride is heated under reflux for about 1 hour. The reaction mixture is then concentrated under reduced pressure, and the residual oil is subjected to a vacuum distillation in a short-path apparatus. A distillate fraction is collected which boils at about 190° at 0.1 mm. pressure, and consists of methyl O-methyl-7-(α,β-dimethyl - β - ethoxycarbonylvinyl)podocarpate. This material is a dehydration product having the following structural formula

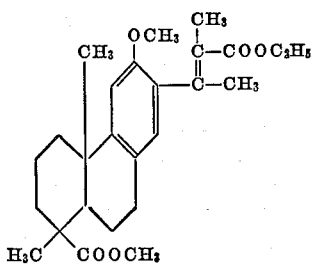

Example 10

A solution prepared from 100 parts of methyl O-methyl-7-(α,β-dimethyl - β - ethoxycarbonylvinyl)podocarpate, as obtained in the preceding example, 35 parts of potassium hydroxide, 720 parts of propylene glycol, 180 parts of water and 100 parts of methanol is heated at 90–100° C. for 3 hours. The mixture is poured, with stirring, into several times its volume of water, and a small amount of insoluble material is collected on a filter and discarded. The filtrate is then acidified with dilute hydrochloric acid. A precipitate of methyl O-methyl-7-(α,β-dimethyl-β-carboxyvinyl)podocarpate forms and is collected on a filter and washed with water. It is purified by recrystallization from aqueous isopropyl alcohol or from aqueous acetone. This produce has the structural formula

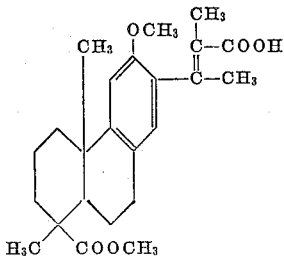

The infrared spectrum shows maxima at about 5.8 and 5.95 microns.

Example 11

Diethyl sulfate (46.2 parts) is added, with stirring, to a solution of 27.4 parts of podocarpic acid and 12.8 parts of sodium hydroxide in 50% aqueous ethanol, and the resulting mixture is boiled for five minutes and allowed to cool. The precipitated ethyl O-ethylpodocarpate is collected on a filter and washed with dilute sodium carbonate solution and water. The ethyl O-ethylpodocarpate is dried thoroughly in a vacuum desiccator. A solution prepared from 19.7 parts of this product and 10 parts of acetyl chloride in 250 parts of nitrobenzene is cooled to 0° C. and treated with 16.2 parts of aluminum chloride added in several portions over a period of one hour. The mixture is stirred at 0° C. for an additional 3 hours, and then allowed to stand at 0–5° C. for 100 hours and finally at room temperature for 5 hours. The mixture is then stirred with ice and dilute hydrochloric acid. The nitrobenzene phase is separated, washed with several portions of water, and distilled with steam until the organic solvent is removed. The precipitate of ethyl O-ethyl-7-acetylpodocarpate remaining is collected on a filter and purified by recrystallization from ethanol.

Example 12

By the procedure of Example 8, with the substitution of 433 parts of ethyl O-ethyl-7-acetylpodocarpate for the methyl O-methyl-7-acetylpodocarpate and with the substitution of 274 parts of ethyl 2-bromohexanoate for the ethyl α-bromopropionate there is obtained ethyl O-ethyl-7-[2-(2-hydroxy - 3 - ethoxycarbonylheptyl)]podocarpate. When this product is dehydrated with acetyl chloride and acetic anhydride by the procedure disclosed in Example 2, the compound obtained is ethyl O-ethyl-7-(α-methyl-β-butyl - β - ethoxycarbonylvinyl)podocarpate. An alkaline hydrolysis of this dehydration product carried out by the procedure of Example 3 yields ethyl O-ethyl-7-(α-methyl-β-butyl-β-carboxyvinyl)podocarpate having the following structural formula The compound shows a specific rotation of +106°.

Example 13

To a stirred mixture of 83 parts of methyl O-methylpodocarpate and 450 parts of chlorobenzene, maintained at about 10–15° C., there is added a total of 75 parts of aluminum chloride in several portions over a 10 minute period. There is then added over a 30 minute period a solution of 42 parts of benzoyl chloride in 40 parts of chlorobenzene. The mixture is allowed to warm to room temperature gradually and is then allowed to stand at about 25° C. for 18 hours, after which it is poured into several times its volume of ice water which has been acidified with hydrochloric acid. The resulting mixture is distilled under reduced pressure until almost all of the chlorobenzene is removed, after which it is extracted with several portions of ether. The combined ether extract is washed with 10% hydrochloric acid, with water, with 10% sodium hydroxide solution, and finally with several portions of water, after which it is concentrated to dryness. By several crystallizations of the non-volatile residue from aqueous acetic acid and then from aqueous methanol there is obtained methyl O-methyl-7-benzoylpodocarpate which melts at about 114–119° C. Substituting an equivalent amount of methyl O-methyl-7-benzoylpodocarpate for the 7-acetyl derivative in Example 1 and following the procedures of Examples 1 and 2, there are obtained on recrystallization from a mixture of chloroform and methanol, crystals of the methyl O-methyl-7-(α-phenyl - β - ethoxycarbonylvinyl)podocarpate containing a half molecule of methanol melting at about 163–165.5° C.

Example 14

A solution of 60 parts of methyl O-methyl-7-(α-phenyl-β-ethoxycarbonylvinyl)podocarpate in 525 parts of pyridine hydrochloride is heated in a flask to a temperature of 210° C. and maintained there for 90 minutes. The mixture is allowed to cool to about 150° C., and is then cautiously poured with stirring into 2000 parts of water. The precipitate is collected on a filter and dried. Upon recrystallization from aqueous methanol there is obtained, as colorless prisms, the lactone of 7-(α-phenyl-β-carboxyvinyl)podocarpic acid which melts at about 242–245° C. The compound has the structural formula

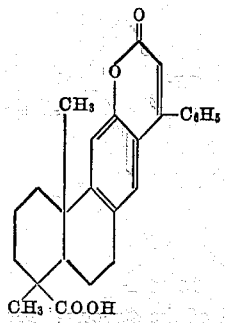

*Example 15*

The pH of a solution of 10 parts of the lactone of 7-(α-phenyl-β-carboxyvinyl)podocarpic acid in 80 parts of methanol is adjusted to about 8 by the addition of a 5% aqueous solution of sodium carbonate. About 13 parts of diethyl sulfate are added and the mixture is stirred. After standing at room temperature for about 30 minutes, 1000 parts of water are added. The solution is adjusted to a pH of 8 with a 5% aqueous solution of sodium carbonate and the solid is collected on a filter. The lactone of ethyl 7-(α-phenyl-β-carboxyvinyl)podocarpate shows absorption in the ultraviolet at 290 and 330 millimicrons and in the infrared at about 5.8 (broad band), 6.17, and 6.44 microns. It has the structural formula

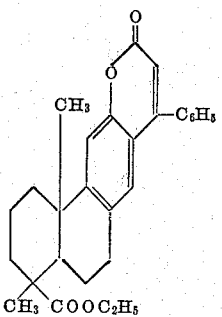

*Example 16*

A solution of 100 parts of methyl O-methyl-7-(α-phenyl-β-ethoxycarbonylvinyl)podocarpate in 100 parts of water, 100 parts of potassium hydroxide and 240 parts of ethanol is heated in an autoclave at 150° for 8 hours. The mixture is cooled and acidified with dilute hydrochloric acid. The solid is collected on a filter, washed with water and dried. The O-methyl-7-(α-phenyl-β-carboxyvinyl)podocarpic acid thus obtained shows absorption in the infrared at about 5.9 microns (broad band). The compound has the structural formula

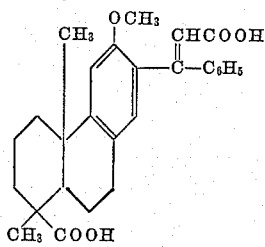

*Example 17*

A mixture of 60 parts of methyl O-methyl-7-(α-methyl-β-carboxyvinyl)podocarpate and 500 parts of pyridine hydrochloride is heated at 210° C. for 10 minutes. The mixture is allowed to cool to about 150° C., and is then cautiously poured with stirring into 2000 parts of water. The precipitate is collected on a filter, dried, and is then taken up in benzene and applied to a chromatography column containing silica gel. Elution with a 5% solution of ethyl acetate in benzene yields the lactone of methyl 7-(α-methyl-β-carboxyvinyl)podocarpate which, after recrystallization from a solution of chloroform and methanol, melts at about 267–269° C. The compound in its lactone form has the structural formula

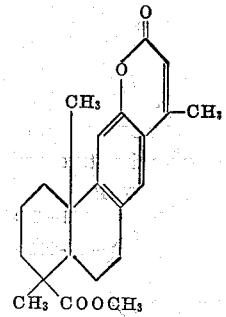

*Example 18*

A solution of 30 parts of methyl O-methyl-7-(α-ethyl-β-ethoxycarbonylvinyl)podocarpate in 260 parts of pyridine hydrochloride is heated in a flask to a temperature of 210° C. and maintained there for 90 minutes. The mixture is allowed to cool to about 150° C., and is then cautiously poured with stirring into 1000 parts of water. The precipitate is collected on a filter and dried. Upon recrystallization from aqueous methanol there is obtained the lactone of 7-(α-ethyl-β-carboxyvinyl)podocarpic acid.

What is claimed is:

1. A member of the class consisting of compounds of the structural formula

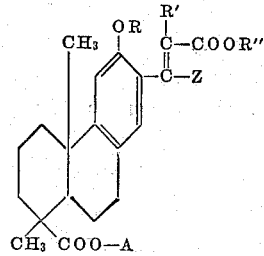

and

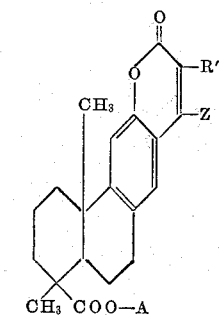

wherein A, R, R', and R" are members of the class consisting of hydrogen and lower alkyl and Z is a member of the class consisting of phenyl and lower alkyl.

2. A compound having the structural formula

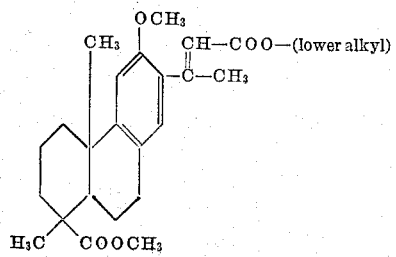

3. A compound having the structural formula

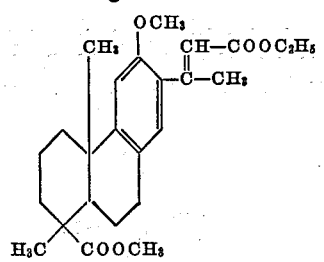

4. A compound having the structural formula

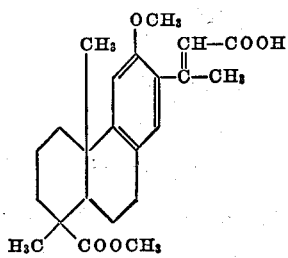

5. A compound of the structural formula

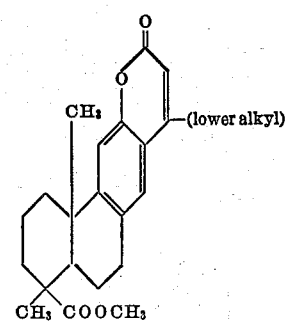

6. A compound of the structural formula

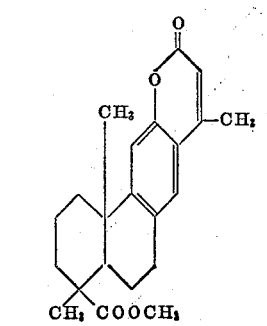

7. A compound of the structural formula

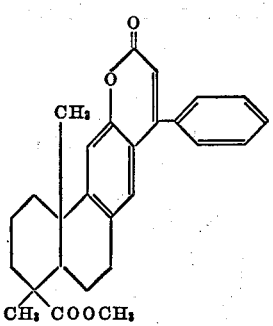

8. A compound of the structural formula

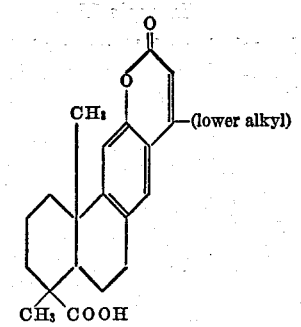

9. A compound of the structural formula

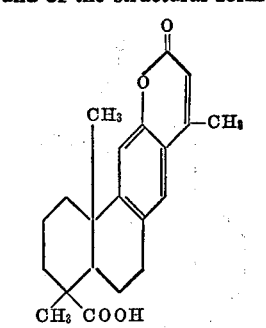

References Cited in the file of this patent
UNITED STATES PATENTS
2,767,162    Picha ----------------- Oct. 16, 1956

OTHER REFERENCES

Elderfield: Hetero. Cmpds., vol. 2, p. 176, Wiley (1951).